US012563044B2

(12) United States Patent
Fujii et al.

(10) Patent No.: US 12,563,044 B2
(45) Date of Patent: Feb. 24, 2026

(54) APPARATUS, METHOD, AND COMPUTER READABLE MEDIUM

(71) Applicant: Yokogawa Electric Corporation, Tokyo (JP)

(72) Inventors: Hideyuki Fujii, Tokyo (JP); Hirotaka Katayama, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 188 days.

(21) Appl. No.: 18/150,774

(22) Filed: Jan. 5, 2023

(65) Prior Publication Data

US 2023/0239305 A1      Jul. 27, 2023

(30) Foreign Application Priority Data

Jan. 21, 2022      (JP) ................................. 2022-007927

(51) Int. Cl.
*H04L 9/40* (2022.01)

(52) U.S. Cl.
CPC .......... *H04L 63/102* (2013.01); *H04L 63/108* (2013.01)

(58) Field of Classification Search
CPC ................ H04L 63/102; H04L 63/108; G05B 13/0265; G05B 13/04; G06F 30/27
See application file for complete search history.

(56) References Cited

U.S. PATENT DOCUMENTS

| | | | |
|---|---|---|---|
| 6,216,112 B1 * | 4/2001 | Fuller | G06Q 30/02 |
| | | | 705/14.19 |
| 2018/0018590 A1 | 1/2018 | Szeto | |
| 2021/0158939 A1 | 5/2021 | Mathur | |
| 2022/0152823 A1 | 5/2022 | Hasunuma | |

FOREIGN PATENT DOCUMENTS

| | | |
|---|---|---|
| CN | 109218024 B | 7/2021 |
| EP | 3932626 A1 | 1/2022 |
| JP | 2018206199 A | 12/2018 |
| JP | 2019526851 A | 9/2019 |
| JP | 2021189792 A | 12/2021 |
| JP | 2022010199 A | 1/2022 |

OTHER PUBLICATIONS

Office Action issued for counterpart Japanese Application No. 2022-007927, transmitted from the Japanese Patent Office on Jan. 9, 2024 (drafted on Dec. 25, 2023).
Extended European Search Report for counterpart European Application No. 23152189.9, issued by the European Patent Office on May 31, 2023.

* cited by examiner

*Primary Examiner* — Paul E Callahan

(57) ABSTRACT

Provided is an apparatus including: a storage unit configured to store an account having a use authority for each of a plurality of learning algorithms; a use control unit configured to restrict use of each learning algorithm to a user of an account having a use authority for the learning algorithm; and a learning processing unit configured to perform learning processing of a learning model by one learning algorithm of the plurality of learning algorithms by using learning data supplied from a user of an account having a use authority for the one learning algorithm.

20 Claims, 7 Drawing Sheets

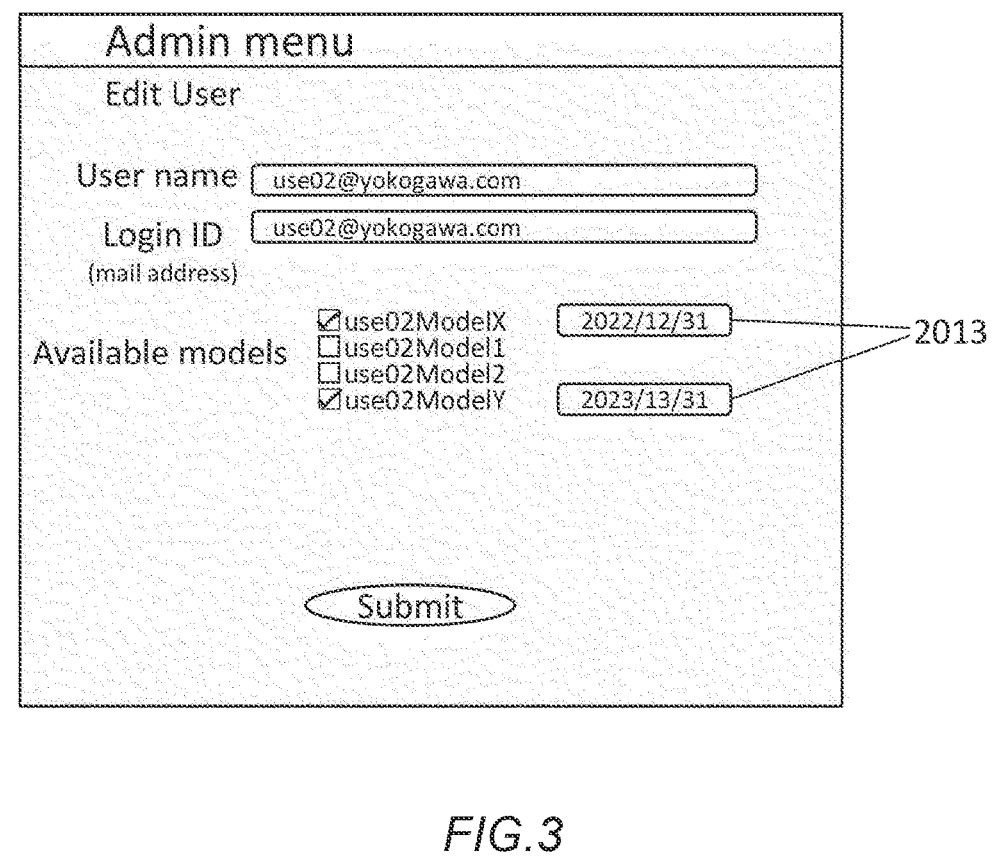

Admin menu

Edit User

User name   use02@yokogawa.com

Login ID   use02@yokogawa.com
(mail address)

Available models
- ☑ use02ModelX   2022/12/31 ————— 2013
- ☐ use02Model1
- ☐ use02Model2
- ☑ use02ModelY   2023/13/31

Submit

*FIG.3*

APPARATUS, METHOD, AND COMPUTER READABLE MEDIUM

The contents of the following Japanese patent application(s) are incorporated herein by reference:

2022-007927 filed in JP on Jan. 21, 2022

BACKGROUND

1. Technical Field

The present invention relates to an apparatus, a method, and a computer readable medium.

2. Related Art

Patent Document 1 discloses that "when willing to build a trained machine learning model that can generate interesting predictions by using in-the-field data . . . unable to access data required by the researcher".

CITATION LIST

Patent Document

Patent Document 1: Japanese translation publication of a PCT rout patent application No. 2019-526851

SUMMARY

A first aspect of the present invention provides an apparatus. The apparatus may include a storage unit configured to store an account having a use authority for each of a plurality of learning algorithms. The apparatus may include a use control unit configured to restrict use of each learning algorithm to a user of an account having a use authority for the learning algorithm. The apparatus may include a learning processing unit configured to perform learning processing of a learning model by one learning algorithm of the plurality of learning algorithms by using learning data supplied from a user of an account having a use authority for the one learning algorithm.

The apparatus may include a registration unit configured to additionally register a new learning algorithm in the storage unit. The registration unit may include an account of a developer of the new learning algorithm in an account having a use authority for the new learning algorithm.

The storage unit may be further configured to store an expiration date of the use authority.

The use control unit may be configured to cause a user of an account having no use authority for a learning algorithm selected as a use target among the plurality of learning algorithms to use any one of learning algorithms for which the account has use authorities among the plurality of learning algorithms.

The use control unit may be configured to restrict use of each learning model to a user of an account having a use authority for a learning algorithm used in learning processing of the learning model among the plurality of learning algorithms.

The storage unit may be further configured to store an account having a use authority for each learning model. The use control unit may be configured to restrict use of each learning model to a user of an account having a use authority for the learning model.

The use control unit may be configured to cause a user of an account having no use authority for a learning model selected as a use target among the plurality of learning models to use any one of learning models for which the account has use authorities among the plurality of learning models.

The apparatus may include an input data acquisition unit configured to acquire input data for one learning model subjected to learning processing by the one learning algorithm from a user of one account having a use authority for the one learning model or from a sensor set by the user of the one account. The apparatus may include a supply unit configured to supply the input data acquired by the input data acquisition unit to the one learning model. The apparatus may include an output unit configured to output output data output from the one learning model, to which the input data has been input, to a user of the one account.

The apparatus may include an accuracy acquisition unit configured to acquire an accuracy of output data output from the one learning model. The apparatus may include a notification unit configured to notify, in response to a fact that the accuracy acquired by the accuracy acquisition unit is lower than a reference value, the user of the one account of the fact.

The supply unit may be further configured to supply the input data acquired by the input data acquisition unit to another learning model. The accuracy acquisition unit may be further configured to acquire an accuracy of output data output from the another learning model. In response to a fact that the accuracy of the output data of the another learning model is higher than the accuracy of the output data of the one learning model, the notification unit may be configured to notify the user of the one account of the fact.

The learning processing unit may be further configured to perform the learning processing of the one learning model by using learning data including the input data according to an instruction from the user of the one account.

A second aspect of the present invention provides a method. The method may include storing an account having a use authority for each of a plurality of learning algorithms. The method may include controlling use by restricting use of each learning algorithm to a user of an account having a use authority for the learning algorithm. The method may include processing learning by performing learning processing of a learning model by one learning algorithm of the plurality of learning algorithms by using learning data supplied from a user of an account having a use authority for the one learning algorithm.

A third aspect of the present invention provides a computer readable medium having recorded thereon a program. The program may cause a computer to function as a storage unit configured to store an account having a use authority for each of a plurality of learning algorithms. The program may cause the computer to function as a use control unit configured to restrict use of each learning algorithm to a user of an account having a use authority for the learning algorithm. The program may cause the computer to function as a learning processing unit configured to perform learning processing of a learning model by one learning algorithm of the plurality of learning algorithms by using learning data supplied from a user of an account having a use authority for the one learning algorithm.

The summary clause does not necessarily describe all necessary features of the embodiments of the present invention. The present invention may also be a sub-combination of the features described above.

BRIEF DESCRIPTION OF THE DRAWINGS

FIG. 3 shows a screen displayed by the apparatus 2 when a use authority is set for each user.

DESCRIPTION OF EXEMPLARY EMBODIMENTS

Hereinafter, the present invention will be described through embodiments of the invention, but the following embodiments do not limit the invention according to the claims. In addition, not all combinations of features described in the embodiments are essential to the solution of the invention.

1. System 1

Figure 1:
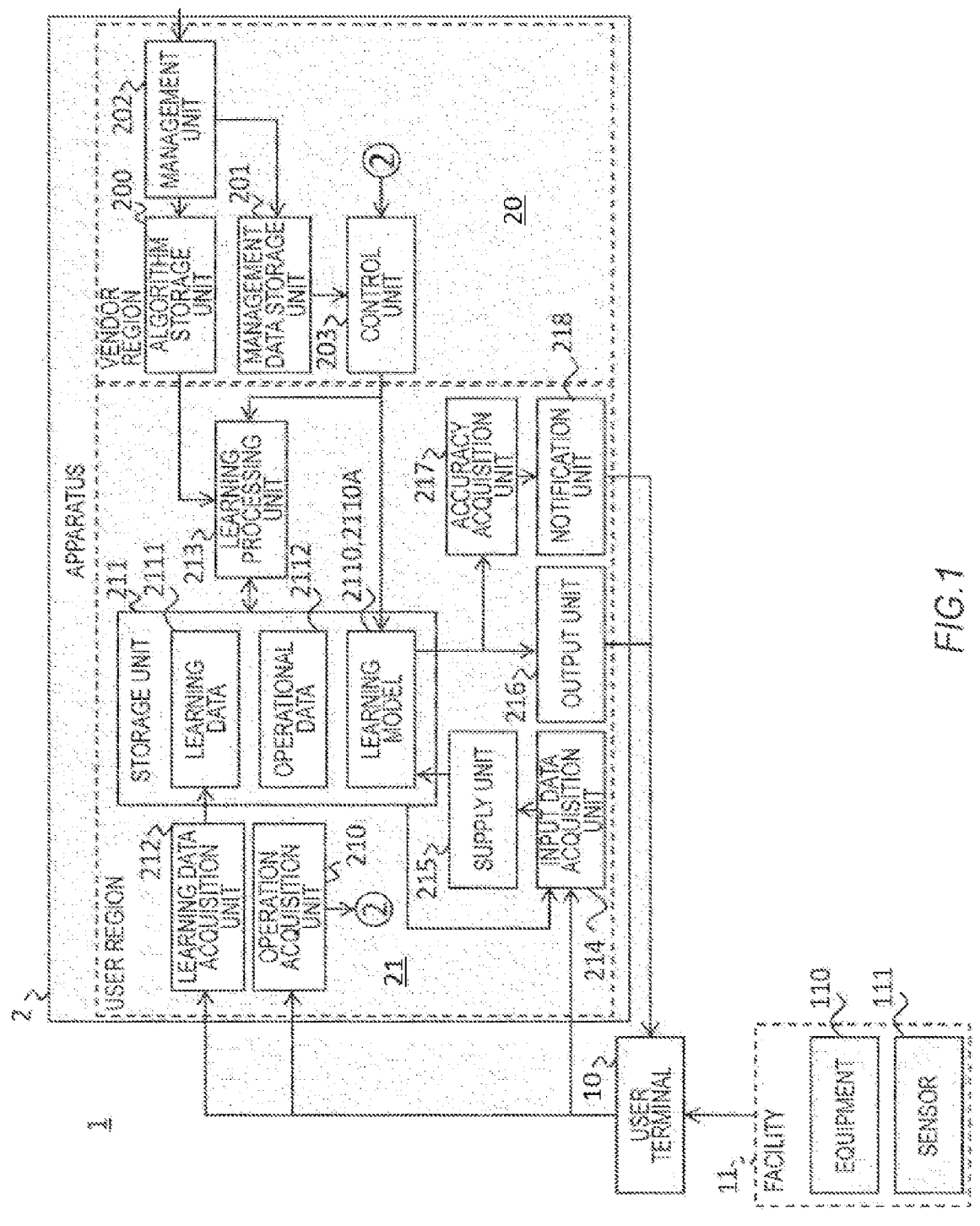
FIG. 1 shows a system 1 according to an embodiment.

FIG. 1 shows a system 1 according to the present embodiment. The system 1 includes one or more user terminals 10, a facility 11, and an apparatus 2.

1.1. User Terminal 10

Each user terminal 10 is a terminal operated by a user. The user terminal 10 may be, for example, a PC. The user of each user terminal 10 may have an account for using a service provided by the apparatus 2.

1.2. Facility 11

Each facility 11 is operated by each user. Each facility 11 may be provided with one or more sensors 111. For example, the facility 11 may be a plant provided with a plurality of pieces of equipment 110, or may be a composite apparatus obtained by combining a plurality of pieces of equipment 110. Examples of the plant include industrial plants such as chemical plants and bio plants, plants that manage and control well sources such as gas fields and oil fields and surroundings thereof, plants that manage and control power generation such as hydraulic power, thermal power, and nuclear power, plants that manage and control environmental power generation such as solar power and wind power, and plants that manage and control water/sewerage, dams, and the like.

1.2.1. Equipment 110

Each piece of equipment 110 is an instrument, machine, or apparatus, and may be, for example, an actuator such as a valve, a pump, a heater, a fan, a motor, a switch, or the like that controls at least one physical quantity of pressure, temperature, pH, speed, flow rate, or the like in a process of the facility 11. The equipment 110 may be of types different from each other, or at least two or more pieces of equipment 110 may be of the same type. In the present embodiment, as an example, the equipment 110 is controlled from the outside in a wired or wireless manner, but may be controlled manually.

1.2.2. Sensor 111

Each sensor 111 measures the state of the facility 11. The sensor 111 may measure at least one physical quantity of pressure, temperature, pH, speed, flow rate, or the like. In addition, the sensor 111 may measure the yield of the facility 11, the quality of a product, the proportion of impurities mixed, the operation status of each piece of equipment 110, or the like. The sensors 111 may be of types different from each other, or at least two or more sensors 111 may be of the same type. As an example, a plurality of sensors 111 may be temperature sensors provided at different positions in a furnace in the facility 11. Each sensor 111 may supply measurement data to the user terminal 10.

1.3. Apparatus 2

The apparatus 2 generates and operates a learning model 2110. The apparatus 2 may be installed by a business operator (also referred to as a vendor) that provides a service of generation and operation of the learning model 2110, and may have a portion (also referred to as a vendor region 20) used by the vendor and a portion (also referred to as a user region 21) used by a user who uses the provided service. The user region 21 may be provided for each user.

The apparatus 2 may include an algorithm storage unit 200, a management data storage unit 201, a management unit 202, and a control unit 203 in the vendor region 20. In addition, the apparatus 2 may include an operation acquisition unit 210, a storage unit 211, a learning data acquisition unit 212, a learning processing unit 213, an input data acquisition unit 214, a supply unit 215, an output unit 216, an accuracy acquisition unit 217, and a notification unit 218 in each user region 21. Note that the apparatus 2 may be one or more computers, may be configured by a PC or the like, or may be realized by cloud computing.

1.3.1. Algorithm Storage Unit 200

The algorithm storage unit 200 stores one or more learning algorithms. The learning algorithm may be an algorithm for performing machine learning, and may be used for learning processing by the learning processing unit 213 described below. For example, the learning algorithm may be random forest, neural network, support vector machine, logistic regression, or the like. The learning algorithm may be a program described in a programming language such as Phython or R language.

A new learning algorithm supplied from the vendor may be additionally stored in the algorithm storage unit 200. The new learning algorithm may be a learning algorithm obtained by correcting an existing learning algorithm already stored in the algorithm storage unit 200, or may be a learning algorithm of a type (for example, Naive Bayes, Markov chain, or the like) different from the existing learning algorithm.

1.3.2. Management Data Storage Unit 201

The management data storage unit 201 is an example of the storage unit, and stores an account having a use authority for each of the plurality of learning algorithms. As an example, the management data storage unit 201 may be a relational database.

Herein, the use of a learning algorithm may mean performing learning processing of the learning model 2110 by using the learning algorithm. In addition to this, or in place of this, the use of a learning algorithm may mean using the learning model 2110 subjected to the learning processing by using the learning algorithm, or may mean copying the learning algorithm to the user region or external equipment connected to the apparatus 2. The management data storage unit 201 may store an account having a use authority for at least some learning algorithms stored in the algorithm storage unit 200. The management data storage unit 201 may store accounts of all users as accounts having a use authority for some learning algorithms for which the use authority is to be given to all users. As an example, such a learning algorithm may be a learning algorithm stored as default in the algorithm storage unit 200 or a learning algorithm in which the learning model 2110 with a low accuracy is generated.

The management data storage unit 201 may further store an expiration date of a use authority. When the expiration date is stored, the account having the use authority may be an account having the use authority within the expiration date. The expiration date may be set only for the use authority of some learning algorithms, or may be set only for the use authority of some accounts. In addition, the expiration date may be set for all use authorities. The expiration date may be different for each use authority, and, for example, may be one month, one year, or the like, or may be indefinite.

The management data storage unit 201 may further store an account having a use authority for each learning model 2110 generated by the learning processing. In the present embodiment, as an example, the account having the use authority for the learning model 2110 is at least a part of the accounts having the use authority for the learning algorithm used for the learning processing of the learning model 2110, but may be an account having no use authority for the learning algorithm. The management data storage unit 201 may further store an expiration date of the use authority of the learning model 2110. The expiration date of the use authority for the learning model 2110 may be set only for the use authority of a part of the learning model 2110 similarly to the expiration date of the use authority for the learning algorithm, or may be set only for the use authority of a part of the accounts. In addition, the expiration date may be set for all use authorities. The expiration date of the use authority for the learning model 2110 may be different for each use authority, and, for example, may be one month, one year, or the like, or may be indefinite.

In addition, the management data storage unit 201 may further store metadata in association with each learning algorithm. The metadata of the learning algorithm may include at least one of an identification number, a name, detailed information, icon information (as an example, image data of an icon or a storage address thereof), a use procedure, or the like. Similarly, the management data storage unit 201 may further store metadata in association with each learning model 2110.

1.3.3. Management Unit 202

The management unit 202 manages the content stored in the algorithm storage unit 200 and the management data storage unit 201.

The management unit 202 may store a new learning algorithm supplied from a vendor operator in the algorithm storage unit 200. In addition, the management unit 202 may edit the learning algorithm stored in the algorithm storage unit 200 according to the operation of the apparatus 2 by the vendor operator.

In addition, the management unit 202 may be an example of the registration unit, and may additionally register a new learning algorithm in the management data storage unit 201. According to the operation of the apparatus 2 by the vendor operator, the management unit 202 may newly store the new learning algorithm as a setting target of the use authority in the management data storage unit 201 to additionally register the learning algorithm.

The management unit 202 may store metadata in the management data storage unit 201 in association with a new learning algorithm to be additionally registered. In addition, when additionally registering the new learning algorithm in the management data storage unit 201, the management unit 202 may store an account having a use authority for the new learning algorithm in the management data storage unit 201. The management data storage unit 201 may include the account of a developer of the new learning algorithm in the account having the use authority for the learning algorithm. The management unit 202 may edit the metadata or the account stored in the management data storage unit 201 according to the operation of the apparatus 2 by the vendor operator.

The new learning algorithm may be developed by at least one of the vendor or the user, and the account for which the use authority is set may be the account of the user who has developed at least a part of the learning algorithm.

1.3.4. Control Unit 203

The control unit 203 controls each unit of the apparatus 2.

For example, the control unit 203 may be an example of the use control unit, and may restrict the use of each learning algorithm to the user of the account having the use authority for the learning algorithm. The control unit 203 may perform the use restriction of the learning algorithm by verification of the account of the user supplied from the operation acquisition unit 210 described below and the account stored in the management data storage unit 201 for the learning algorithm to be used.

As an example, the control unit 203 may restrict the learning processing using one learning algorithm to the user of the account having the use authority for the one learning algorithm. The control unit 203 may disable the learning processing unit 213 when a user of an account having no use authority for one learning algorithm causes the learning processing unit 213 described below to perform the learning processing using the one learning algorithm.

In addition, the control unit 203 may restrict the use of each learning model 2110 to the user of the account having the use authority for the learning model 2110. The control unit 203 may perform the use restriction of the learning model 2110 by verification of the account of the user supplied from the operation acquisition unit 210 and the account stored in the management data storage unit 201 for the learning model 2110 to be used. The control unit 203 may disable the learning model 2110 when a user of an account having no use authority for one learning model 2110 uses the one learning model 2110.

In addition, the control unit 203 may cause a display unit (not illustrated) to display metadata about a learning algorithm or an input screen or an edit screen thereof, may cause the display unit to display a list of learning algorithms, or may cause the display unit to display a setting screen of a use authority for each user.

1.3.5. Operation Acquisition Unit 210

The operation acquisition unit 210 acquires various operations from a user of a service provided by the apparatus 2. The operation acquisition unit 210 may acquire an operation from the user terminal 10. The operation acquisition unit 210 may acquire input content and selection content by the user from the acquired operation content. For example, the operation acquisition unit 210 may acquire the account of the user, or may acquire the learning algorithm to be used or the selection content of the learning model 2110. The operation acquisition unit 210 may supply the acquired content to the control unit 203.

1.3.6. Storage Unit 211

The storage unit 211 stores various types of information. In the present embodiment, as an example, the storage unit 211 may store one or more learning models 2110, learning data 2111, and operational data 2112. Note that the information stored in the storage unit 211 of the user region 21 may be accessible from the vendor.

Each learning model 2110 is generated by learning processing by the learning processing unit 213. Each learning model 2110 may output output data indicating a result of estimation, determination, or evaluation according to input of input data.

In the present embodiment, as an example, the learning model 2110 may output output data indicating a state of the facility 11, a failure cause of the facility 11, a state of a product of the facility 11, or the like according to input of measurement data by the sensor 111 as the input data.

Additionally or alternatively, the learning model 2110 may output output data indicating control content of the facility 11 recommended to realize a target state for the facility 11 or the product according to input of data acquired by the sensor 111 as the input data. The control content of the facility 11 may indicate at least one physical quantity of pressure, temperature, pH, speed, flow rate, or the like in the process of the facility 11, or may indicate a control parameter for the equipment 110 provided in the facility 11.

The learning data 2111 is used for learning processing of the learning model 2110. The learning data 2111 may include data of the same type as the input data and the output data for the learning model 2110 after the learning processing. As an example, the learning data 2111 may include measurement data when the facility 11 has been operated before and data indicating an actual state of the facility 11 or a product. In addition, the learning data 2111 may include the measurement data when the facility 11 has been operated before and the control content of the facility 11.

The operational data 2112 includes the input data for the learning model 2110 and the output data from the learning model 2110 when the learning model 2110 after the learning processing is used. Note that the input data included in the learning data 2111 and the input data included in the operational data 2112 are not necessarily measured by the sensor 111 of the same facility 11. In other words, in the learning model 2110, the learning processing may be performed with the learning data including the input data measured by the sensor 111 of one facility 11 in a learning stage, and the input data measured by the sensor 111 of another facility 11 may be input in an operation stage after the learning.

1.3.7. Learning Data Acquisition Unit 212

The learning data acquisition unit 212 acquires learning data from the user. In the present embodiment, as an example, the learning data acquisition unit 212 may acquire the learning data from the user terminal 10. The learning data acquisition unit 212 may store the acquired learning data in the storage unit 211.

1.3.8. Learning Processing Unit 213

The learning processing unit 213 performs the learning processing of the learning model 2110 by any one of the learning algorithms stored in the algorithm storage unit 200. The learning processing unit 213 may perform the learning processing of the learning model 2110 by one learning algorithm among the plurality of learning algorithms by using the learning data supplied from a user of an account having the use authority for the one learning algorithm. In the present embodiment, as an example, the learning processing unit 213 may perform the learning processing by using the learning data 2111 stored in the storage unit 211 in the same user region as the learning processing unit 213. As a result, the learning data used for the learning processing by one learning algorithm may be restricted to the learning data supplied from the user of the account having the use authority for the one learning algorithm.

1.3.9. Input Data Acquisition Unit 214

The input data acquisition unit 214 acquires, from the user, input data for the learning model 2110. The input data acquisition unit 214 may acquire input data for one learning model 2110 subjected to the learning processing by one learning algorithm from the user of one account having the use authority for the one learning model 2110 or from the sensor 111 set by the user of the one account. In the present embodiment, as an example, the input data acquisition unit 214 may acquire the input data from the user terminal 10. In addition, the input data acquisition unit 214 may acquire the input data from the learning data 2111 supplied from the user terminal 10 and stored in advance in the storage unit 211. The input data acquisition unit 214 may supply the acquired input data to the supply unit 215.

1.3.10. Supply Unit 215

The supply unit 215 supplies, to the one learning model 2110, the input data for one learning model 2110 acquired by the input data acquisition unit 214.

1.3.11. Output Unit 216

The output unit 216 outputs the output data output from one learning model 2110, to which the input data has been input by the supply unit 215, to the user of the one account described above, that is, the user of the supply source of the input data.

1.3.12. Accuracy Acquisition Unit 217

The accuracy acquisition unit 217 acquires accuracy of the output data output from one learning model 2110. The accuracy of the output data may be a degree of accuracy of the output data. In addition, the accuracy of the output data may be a degree of accuracy of estimation, determination, or evaluation by the learning model 2110.

For example, when the output data indicates the state of the facility 11 or the product by binary or multi-valued state parameters, the accuracy may be an approximation degree between the value of the state parameter indicated by the output data and the value of the state parameter corresponding to the actual state of the facility or the product. Alternatively, when the output data indicates the control content of the facility 11 recommended to achieve the target state for the facility 11 or the product by the binary or multi-value control parameter, the accuracy may be an approximation degree between the value of the actual state parameter indicating the state in a case where the facility 11 is actually controlled by the value of the control parameter indicated by the output data and the value of the state parameter indicating the target state.

The accuracy acquisition unit 217 may calculate the accuracy. The accuracy acquisition unit 217 may supply the acquired accuracy to the notification unit 218.

1.3.13. Notification Unit 218

According to the accuracy acquired by the accuracy acquisition unit 217 being lower than a reference value, the notification unit 218 notifies the user of one account using the learning model 2110 of the fact. The reference value may be arbitrarily set. The user of the account that has received the notification may change the learning model 2110 to be used, may perform the learning processing of the learning model 2110 again, or may change the reference value.

According to the above apparatus 2, the learning processing of the learning model 2110 is performed using the learning data supplied from the user, and thus, it is possible to aggregate, on the vendor side, the data owned by the user and the domain knowledge specific to the domain of the data. Therefore, a learning algorithm suitable for the domain can be developed on the vendor side. In addition, the use of each learning algorithm is restricted to the user of the account having the use authority for the learning algorithm, and the learning processing of the learning model 2110 is performed by one learning algorithm by using learning data supplied from the user of the account having the use authority for the one learning algorithm. Therefore, it is possible to prevent the use of the learning algorithm by the user of the account having no use authority and to improve the efficiency of the use of the learning algorithm by the user of the account having the use authority. In addition, a desired learning model 2110 can be generated by allowing the user of each account to use the learning algorithm according to the need. In addition, it is possible to realize monetization by allowing the user of the account to use the learning algorithm or the generated learning model 2110.

In addition, a new learning algorithm is additionally registered, and the account of the developer is included in the account having the use authority for the new learning algorithm. Therefore, the developer of the new learning algorithm can leave the management of the learning algorithm to the vendor while continuing the use of the new learning algorithm. Thus, it is possible to prompt the developer of the learning algorithm to register a new learning algorithm and to increase the number of available learning algorithms. In addition, information regarding the newly developed learning algorithm can be aggregated on the vendor side.

In addition, since the expiration date of the use authority is further stored in the management data storage unit 201, the use of each learning algorithm is restricted to the user of the account having the use authority within the expiration date for the learning algorithm. Therefore, it is possible to further restrict the user of the learning algorithm and to further improve the efficiency of the use of the learning algorithm by the user of the account having the use authority.

In addition, the use of each learning model 2110 is restricted to the user of the account having the use authority for the learning algorithm used in the learning processing. Therefore, it is possible to prevent the use of the learning model 2110 by the user of the account having no use authority for the learning algorithm and to improve the efficiency of the use of the learning model 2110. In addition, it is possible to prompt the user of the account that desires to use the learning model 2110 to acquire the use authority.

In addition, input data is acquired from the user of one account having the use authority for one learning model 2110 or the sensor 111 set by the user and supplied to the one learning model 2110, and output data output from the one learning model 2110 is supplied to the user of one account. Therefore, the user of the account having the use authority can use the learning model 2110 via the apparatus 2 and acquire the output data corresponding to the input data from the learning model 2110.

In addition, according to the accuracy of the output data output from one learning model 2110 being lower than the reference value, the user of the account using the learning model 2110 is notified of the fact. Therefore, it is possible to prompt the user of the account using the learning model 2110 with low accuracy to further perform the learning processing for the learning model 2110 or change the learning model 2110 to be used.

2. Display Screen Example

Figure 2:
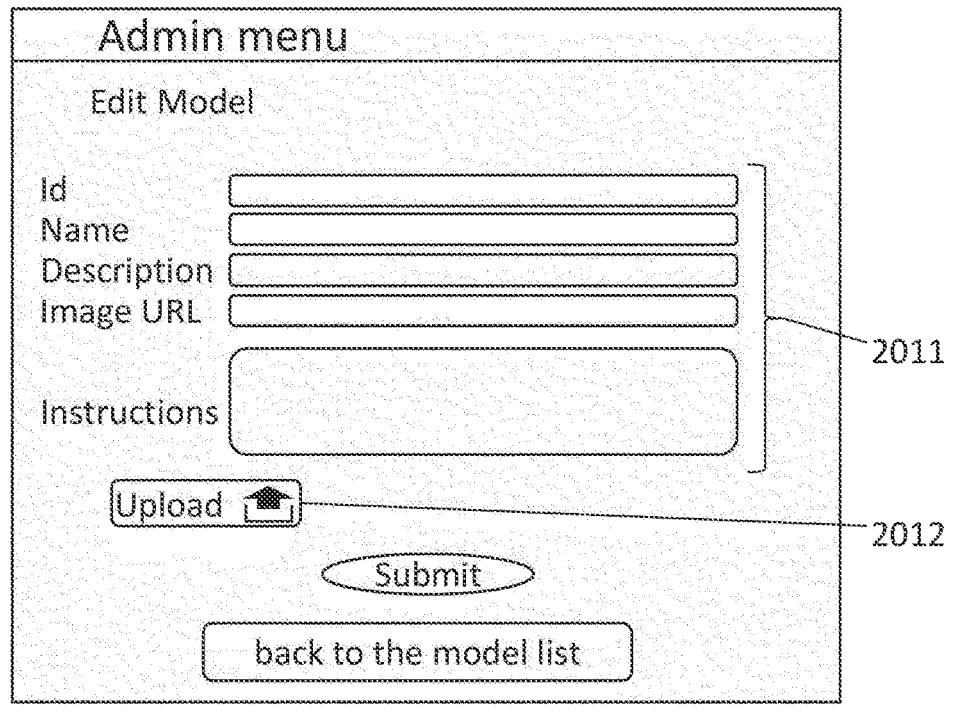
FIG. 2 shows a screen displayed by an apparatus 2 when a new learning algorithm is registered additionally.

FIG. 2 shows a screen displayed by the apparatus 2 when a new learning algorithm is additionally registered. When the new learning algorithm is additionally registered, an input field 2011 of metadata (in the present embodiment, as an example, an identification number or a name of a learning algorithm, detailed information, icon information, a use procedure, or the like) of the learning algorithm may be displayed on the display screen, and the metadata corresponding to the input content may be stored in the management data storage unit 201. In addition, an upload button 2012 for storing the learning algorithm in the algorithm storage unit 200 may be displayed on the display screen.

When the learning algorithm registered in the management data storage unit 201 is confirmed, a list of the registered learning algorithms may be displayed on the display screen. In the list of learning algorithms, the metadata of each learning algorithm may be displayed in the list. In this state, the management unit 202 may edit the content of the metadata or additionally register or delete the learning algorithm according to the operation of the apparatus 2 by the vendor operator.

FIG. 3 shows a screen displayed by the apparatus 2 when a use authority is set for each user. When the use authority is set for each user, the account of a selected user, the name of each learning algorithm registered in the management data storage unit 201, and a check box for each learning algorithm for setting the use authority may be displayed on the display screen. In addition, when any one of the learning algorithms is selected, the name of the learning model 2110 on which the learning processing has been performed by the learning algorithm and the check box for each learning algorithm for setting the use authority may be displayed on the display screen. For the learning algorithm in which the use authority is set or the learning model 2110, an input field 2013 of the expiration date may be displayed.

3. Operation of Apparatus 2

Figure 4:
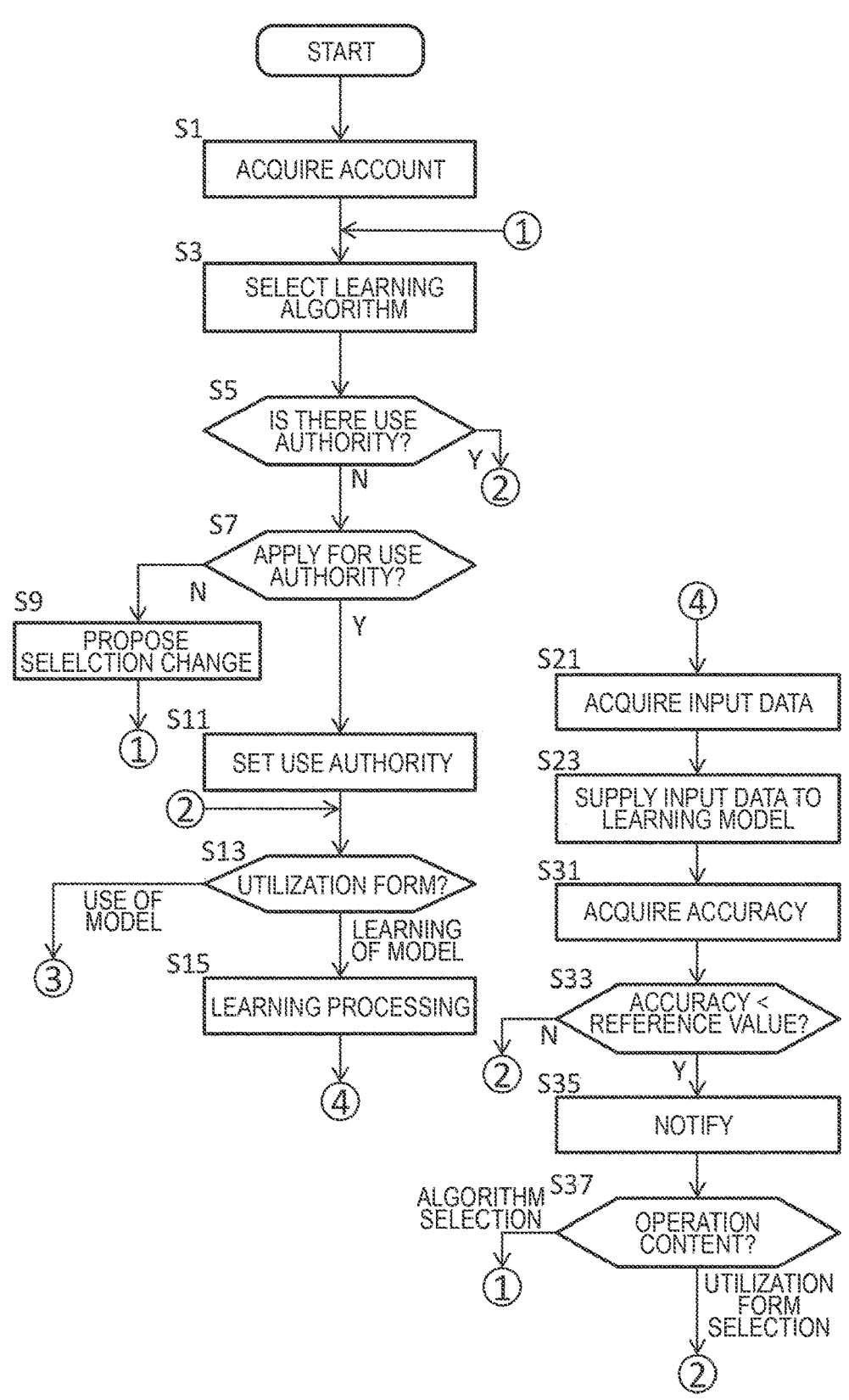
FIG. 4 shows operations of the apparatus 2.
Figure 5:
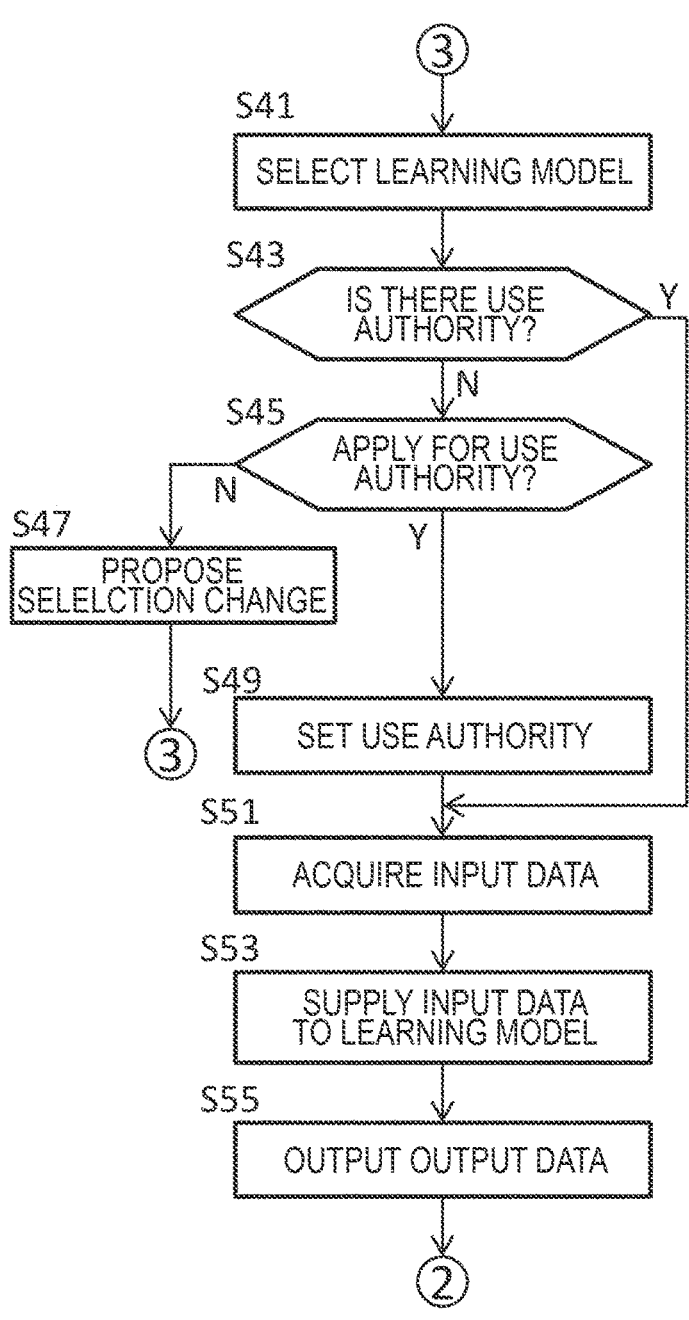
FIG. 5 shows operations of the apparatus 2.

FIGS. 4 and 5 show the operation of the apparatus 2. The apparatus 2 may generate and operate the learning model 2110 by performing processes of steps S1 to S55. Note that, in this operation, a learning algorithm may be stored in advance in the algorithm storage unit 200, and an account having the use authority may be stored for each learning algorithm in the management data storage unit 201.

In step S1, the operation acquisition unit 210 acquires an account of the user (also referred to as a first account of a first user to be distinguished from accounts of other users). The operation acquisition unit 210 may acquire the first account from the first user who logs in to the service provided by the apparatus 2.

In step S3, the operation acquisition unit 210 acquires a selection operation of a learning algorithm as a use target. The operation acquisition unit 210 may acquire the selection operation using, as the use target, any one of a plurality of learning algorithms stored in the algorithm storage unit 200.

In step S5, the control unit 203 determines whether the first account has the use authority for the selected learning algorithm. When the expiration date of the use authority has expired, the control unit 203 may determine that the first account does not have the use authority. When it is determined in step S5 that the first account does not have the use authority (step S5; No), the process may proceed to step S7. When it is determined in step S5 that the first account has the use authority (step S5; Yes), the process may proceed to step S13.

In step S7, the control unit 203 determines whether an operation for applying for the use authority for the selected learning algorithm is performed via the operation acquisition unit 210. When it is determined in step S7 that the application operation for the use authority is not performed (step S7; No), the process may proceed to step S9. When it is determined in step S7 that the application operation for the use authority has been performed (step S7; Yes), the process may proceed to step S11.

In step S9, the control unit 203 may supply, to the first user, a message proposing use of another learning algorithm in the algorithm storage unit 200. As a result, the use of the learning algorithm by the user having no use authority is prevented, and the use of each learning algorithm is restricted to the user of the account having the use authority for the learning algorithm. In addition, the user of the account having no use authority for the selected learning algorithm uses any one of the learning algorithms for which the account has use authorities. The control unit 203 may supply, to the first user, a list of learning algorithms for which the first account has the use authorities, and cause the first user to select any one of the learning algorithms. When the process of step S9 is completed, the process may proceed to step S3 described above.

In step S11, the control unit 203 sets, to the first account, the use authority for the selected learning algorithm. The control unit 203 may store the first account as the account having the use authority for the selected learning algorithm in the management data storage unit 201. The control unit 203 may set the use authority on condition that the usage fee of the selected learning algorithm is paid.

In step S13, the control unit 203 determines which one of the learning processing of the learning model 2110 and the use of the learning model 2110 is selected as a utilization form of the service by the first user. When it is determined that the learning processing of the learning model 2110 is selected (step S13; the learning of the model), the process may proceed to step S15. When it is determined that the use of the learning model 2110 has been selected (step S13; the use of the model), the process may proceed to step S21.

In step S15, the learning processing unit 213 performs the learning processing of the learning model 2110 by the selected learning algorithm. The learning processing unit 213 may use the learning data supplied from the first user to perform the learning processing of the learning model 2110 by the one learning algorithm. The learning processing unit 213 may perform the learning processing by using the learning data 2111 (as an example, the learning data 2111 selected by the first user among the learning data 2111 stored in the storage unit 211) stored in the storage unit 211. The learning processing unit 213 may use a part of the learning data 2111 for the accuracy confirmation in steps S21 to S31 described below, and perform the learning processing by using the rest of the learning data 2111.

The learning processing unit 213 may further perform the learning processing of the learning model 2110 already used in the processing of steps S41 to S55 described below according to an instruction from the first user. The learning processing unit 213 may perform the learning processing by using learning data including the input data input to the learning model 2110 in step S53 described below.

After the learning processing, the generated learning model 2110 (also referred to as a learning model 2110A to be distinguished from other learning models 2110) may be stored in the storage unit 211 of the user region 21 of the first user. In addition, the first account may be stored, in the management data storage unit 201, as the account having the use authority for the learning model 2110A. In this case, the management data storage unit 201 may store a preset reference expiration date as the expiration date of the use authority. Alternatively, the use authority for the learning model 2110A may be stored in the management data storage unit 201 according to the operation of the vendor operator.

In step S21, the input data acquisition unit 214 acquires the input data for the learning model 2110A from the learning data, which has been used for the accuracy confirmation in step S15 and has not been used for the learning processing, among the learning data 2111 stored in the storage unit 211.

In step S23, the supply unit 215 supplies the acquired input data to the learning model 2110A. In the present embodiment, as an example, the supply unit 215 may further supply the acquired input data to one or more other learning models 2110. The other learning model 2110 may be a learning model 2110 different from the learning model 2110A among the learning models 2110 in the user region 21 of the first user. Alternatively, the other learning model 2110 may be a learning model 2110 in another user region 21 in the apparatus 2.

In step S31, the accuracy acquisition unit 217 acquires the accuracy of the output data of the learning model 2110A. When acquiring, as the accuracy, the approximation degree between the value of the state parameter indicated by the output data and the actual value of the state parameter, the accuracy acquisition unit 217 may calculate the accuracy by acquiring the output data from the learning model 2110A and acquiring the actual value of the state parameter from the first user. In addition, when acquiring, as the accuracy, the approximation degree between the value of the state parameter indicating the target state and the actual value of the state parameter, the accuracy acquisition unit 217 may calculate the accuracy by acquiring the value of the state parameter indicating the target state from the learning model 2110A and acquiring the actual value of the state parameter from the first user.

The accuracy acquisition unit 217 may further acquire the accuracy of the output data output from the other learning model 2110 to which the input data has been supplied in step S23 described above. The accuracy acquisition unit 217 may acquire the accuracy of the output data of another learning model 2110 in a manner similar to that of the accuracy of the output data of the learning model 2110A.

In step S33, the notification unit 218 determines whether the accuracy acquired by the accuracy acquisition unit 217 is lower than the reference value. In the present exemplary operation, as an example, the reference value may be the accuracy of the output data output from another learning model 2110. When it is determined in step S33 that the accuracy is lower than the reference value (step S33; Yes), the process may proceed to step S35. A case where the accuracy is lower than the reference value may be a case where the accuracy of the output data output from one or more other learning models 2110 is higher than the accuracy of the output data of the learning model 2110A. When it is determined in step S33 that the accuracy is the reference value or higher (step S33; No), the process may proceed to step S13.

In step S35, the notification unit 218 notifies the first user that the accuracy of the output data of the learning model 2110A is lower than the reference value. In the present exemplary operation, as an example, in response to the fact that the accuracy of the output data of the other learning model 2110 is higher than the accuracy of the output data of the learning model 2110A, the notification unit 218 may notify the first user of the fact. In this case, the notification unit 218 may supply the first user with a message indicating another learning model 2110 having a higher accuracy than the learning model 2110A and the learning algorithm used for the learning processing.

In step S37, the control unit 203 determines which of the operation for selecting the learning algorithm and the operation for selecting the utilization form of the learning algorithm is performed via the operation acquisition unit 210 by the first user. When it is determined in step S37 that the operation for selecting the learning algorithm has been performed (step S37; algorithm selection), the process may proceed to step S3. As a result, the first user who has received the notification may correct the learning algorithm used for the learning processing of the learning model 2110A, develop a new learning algorithm, and cause the vendor to upload the new learning algorithm to the algorithm storage unit 200. As a result, the new learning algorithm can be selected in step S3. In addition, when it is determined in step S37 that the operation for selecting the utilization form has been performed (step S37; utilization form selection), the process may proceed to step S13. As a result, the first user who has received the notification may perform the learning processing of the learning model 2110A with a low accuracy of the output data again, or may use another learning model 2110.

In step S41, the operation acquisition unit 210 acquires the selection operation of the learning model 2110 as a use target. The operation acquisition unit 210 may acquire a selection operation using, as the use target, any one of the learning models 2110 stored in the storage unit 211. Note that, in the present embodiment, as an example, the operation acquisition unit 210 may acquire a selection operation using, the use target, the learning model 2110 for which the first account has the use authority, or may acquire a selection operation using, the use target, the learning model 2110 for which the first account does not have the use authority. As an example, the learning model 2110 for which the first account does not have the use authority may be the learning model 2110 of which the expiration date has expired among the learning models 2110 stored in the storage unit 211 of the user region 21 of the first user, or may be the learning model 2110 stored in the storage unit 211 of another user region 21.

In step S43, the control unit 203 determines whether the first account has the use authority for the selected learning model 2110. When the expiration date of the use authority has expired, the control unit 203 may determine that the first account does not have the use authority. When it is determined in step S43 that the first account does not have the use authority (step S43; No), the process may proceed to step S45. When it is determined in step S43 that the first account has the use authority (step S43; Yes), the process may proceed to step S51.

In step S45, the control unit 203 determines whether an operation of applying for the use authority for the selected learning model 2110 is performed via the operation acquisition unit 210. When it is determined in step S45 that the application operation for the use authority is not performed (step S45; No), the process may proceed to step S47. When it is determined in step S45 that the application operation for the use authority has been performed (step S45; Yes), the process may proceed to step S49.

In step S47, the control unit 203 may supply, to the first user, a message proposing use of another learning model 2110 in the user region 21 of the first user. As a result, the use of each learning model 2110 is restricted to the user of the account having the use authority for the learning model 2110. In addition, the user of the account having no use authority for the selected learning model 2110 uses any one of the learning models 2110 for which the account has the use authorities. The control unit 203 may supply, to the first user, a list of the learning models 2110 for which the first account has the use authority and cause the first user to select any one of the learning models 2110. When the process of step S47 is completed, the process may proceed to step S41 described above.

In step S49, the control unit 203 sets, to the first account, the use authority for the selected learning model 2110. The control unit 203 may store the first account as an account having the use authority for the selected learning model 2110 in the management data storage unit 201. The control unit 203 may set the use authority on condition that the usage fee of the selected learning model 2110 is paid.

In step S51, the input data acquisition unit 214 acquires the input data from the first user or from the sensor 111 set by the first user.

In step S53, the supply unit 215 supplies the acquired input data to the selected learning model 2110.

In step S55, the output unit 216 outputs, to the first user, the output data output from the selected learning model 2110. The output data may be stored as the operational data 2112 together with the input data acquired in step S51 in the storage unit 211. When the process of step S55 is completed, the process may proceed to step S13 described above.

According to the above operation, any one of the learning algorithms for which the account has the use authorities is provided as the use target with the user of the account that does not have the use authority for the learning algorithm set as the use target. Therefore, even when the user does not have the use authority of the learning algorithm selected as the use target, another learning algorithm can be used.

Similarly, for an account that does not have the use authority for the learning model 2110 set as the use target, any one of the learning models 2110 for which the account has the use authorities is provided as the use target. Therefore, even when an account does not have the use authority for the learning model 2110 selected as the use target, another learning model 2110 can be used.

In addition, the input data acquired from the first user is supplied to another learning model 2110, the accuracy of the output data output from the another learning model 2110 is further acquired, and in response to the fact that the accuracy of the output data of the another learning model 2110 is higher than the accuracy of the output data of the one used learning model 2110, the first user is notified of the fact. Therefore, it is possible to notify the first user of the presence of another learning model 2110 having a higher accuracy than the one used learning model 2110 and to prompt the change of the learning model 2110 to be used.

In addition, according to an instruction from the first user, the learning processing of the learning model 2110 is further performed by using learning data including the input data input to the learning model 2110. Therefore, additional learning processing can be performed on the learning model 2110 by using the input data used when the learning model 2110 is used.

4. Modification

Figure 6:
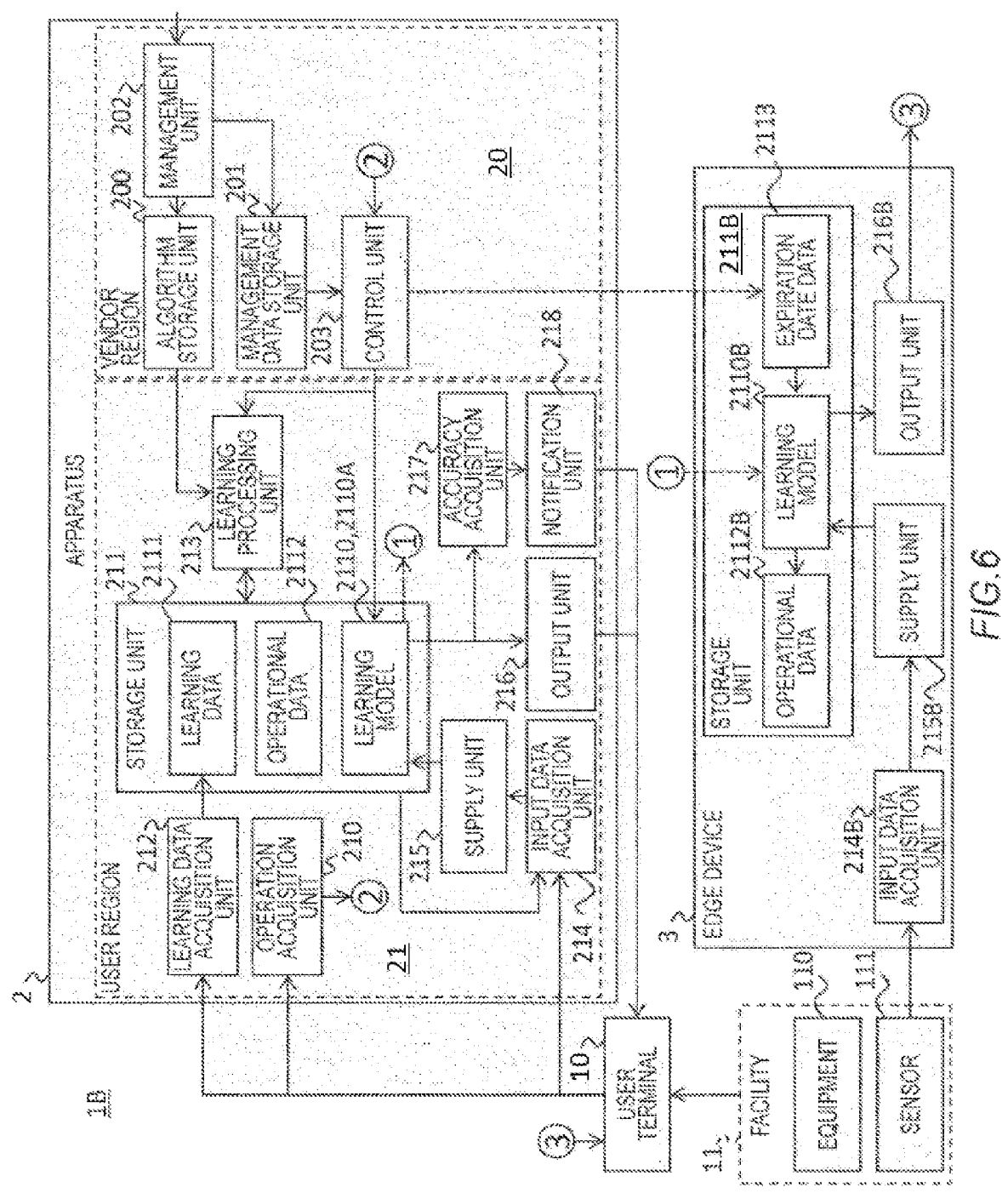
FIG. 6 shows a system 1B according to a modification.

FIG. 6 shows a system 1B according to a modification. The system 1B includes the apparatus 2, one or more facilities 11, and one or more edge devices 3. Note that, in the system 100 according to the present modification, substantially the same components as those shown in FIG. 1 are denoted by the same reference numerals, and description thereof will be omitted.

The edge device 3 is provided so that a user (also referred to as a second user to be distinguished from other users) who uses the service provided by the apparatus 2 can communicate with the facility 11 and the apparatus 2. The edge device 3 may be provided in the vicinity of the facility 11 or may be provided in the facility 11. The edge device 3 includes a storage unit 211B, an input data acquisition unit 214B, a supply unit 215B, and an output unit 216B.

The storage unit 211B stores an expiration date data 2113, a learning model 2110B, and operational data 2112B. The expiration date data 2113 may indicate the expiration date of the use authority which the account (also referred to as a second account) of the user has with respect to the learning model 2110B. The second user may be the same user as the first user in the above-described embodiment, or may be a different user.

The learning model 2110B may be the same learning model as any one of the learning models 2110 stored in the user region 21 of the second user. The learning model 2110B may be the learning model 2110 for which the second account has the use authority. When the expiration date indicated by the expiration date data 2113 has expired, the learning model 2110B does not need to perform at least the output of the output data.

The operational data 2112B includes input data for the learning model 2110B in a case where the learning model 2110B is used and output data from the learning model 2110B.

In a state where the edge device 3 after manufacture is connected to the apparatus 2, the learning model 2110B in the storage unit 211B may be downloaded from the storage unit 211 of the apparatus 2 to the storage unit 211B of the edge device 3 according to the operation of the second user or the vendor. In addition, when the learning model 2110B is downloaded to the edge device 3, the expiration date data 2113 may be read from the management data storage unit 211 by the control unit 203 and downloaded to the storage unit 211B of the edge device 3. However, the learning model 2110B and the expiration date data may be downloaded from the apparatus 2 to the storage unit 211B in advance at the time of manufacturing the edge device 3.

The input data acquisition unit 214B acquires input data for the learning model 2110B from the sensor 111 set by the second user. The input data acquisition unit 214B may supply the acquired input data to the supply unit 215B.

The supply unit 215B supplies the input data acquired by the input data acquisition unit 214B to the learning model 2110B.

The output unit 216B outputs, to the second user, the output data output from the learning model 2110B to which the input data has been input by the supply unit 215B. The output unit 216 may output the output data to the user terminal 10 of the second user.

The above edge device 3 may perform the processing of steps 51 to 55 described above as long as the expiration date has not expired, and output, to the user terminal 10 of the second user, the output data obtained by supplying, to the learning model 2110B, the input data from the sensor 111.

According to the above modification, it is possible to supply the measurement data by the sensor 111 to the learning model 2110B in real time and acquire the output data from the learning model 2110B.

In the above modification, the edge device 3 has been described as including the storage unit 211B, the input data acquisition unit 214B, the supply unit 215B, and the output unit 216B, but may further include other configurations. For example, the edge device 3 may further include the accuracy acquisition unit 217 and the notification unit 218 in the above-described embodiment.

5. Another Modification

In the embodiment and the modification described above, the apparatus 2 has been described as including the algorithm storage unit 200, the management unit 202, the operation acquisition unit 210, the storage unit 211, the learning data acquisition unit 212, the input data acquisition unit 214, the supply unit 215, the output unit 216, the accuracy acquisition unit 217, and the notification unit 218, but may not include any of these. For example, when the apparatus 2 does not include the algorithm storage unit 200, the learning algorithm may be stored in a storage device externally connected to the apparatus 2. Similarly, when the apparatus 2 does not include the storage unit 211, the learning model 2110 may be stored in a storage device externally connected to the apparatus 2.

In addition, it has been described that the control unit 203 restricts the use of each of the learning models 2110 and 2110B to the user of the account having the use authorities for the learning models 2110 and 2110B, but the use may be restricted to the user of the account having another use authority. For example, the control unit 203 may restrict the use of each of the learning models 2110 and 2110B to the user of the account having the use authority for the learning algorithm used in the learning processing of the learning models 2110 and 2110B. In this case, the management data storage unit 201 may store the use authority for the learning algorithm and may not store the use authority for the learning model 2110. In addition, the management data storage unit 201 may also store the use authority of the learning algorithm as the use authority for each of the learning models 2110 and 2110B on which the learning processing has been performed by the learning algorithm. In addition, the management data storage unit 201 may also store the expiration date of the use authority of the learning algorithm as the expiration date of the use authority for each of the learning models 2110 and 2110B on which the learning processing has been performed by the learning algorithm.

In addition, it has been described that the accuracy acquisition unit 217 acquires the accuracy of the output data acquired from the learning model 2110 after the learning processing in step S15, but the accuracy of the output data acquired by using the learning model 2110 in steps S51 to S55 may be acquired. In this case, when it is determined that the accuracy of the output data is low in the operation stage of the learning model 2110, the notification unit 218 may perform notification.

In addition, the accuracy acquisition unit 217 has been described as using, as the reference value, the accuracy of the output data output from another learning model 2110, but a fixed value set in advance by the vendor or the user may be used as the reference value.

In addition, it has been described that when the expiration date of the use authority has expired, the control unit 203 determines whether the application for the use authority is made. However, in response to a time until the expiration date falling below a reference time, the control unit may notify the user of the account having the use authority in advance and prompt the user to update the use authority.

Further, it has been described that when the application for the use authority is not made, the control unit 203 proposes the change of the learning algorithm or the learning model 2110 as the use target, but the process may be ended.

Further, it has been described that the sensor 111 measures a physical quantity such as pressure and temperature, but image data may be acquired by using an image sensor. In this case, the learning model 2110 may output the result of image recognition in response to the input of the image data. As an example, the sensor 111 may be an image sensor in a surveillance camera, and the learning model 2110 may detect a person in the image.

In addition, various embodiments of the present invention may be described with reference to flowcharts and block diagrams, wherein the block may serve as (1) a stage in a process in which an operation is performed, or (2) a section of an apparatus having a role of performing an operation. Certain stages and sections may be implemented by dedicated circuitry, programmable circuitry provided with computer readable instructions stored on a computer readable medium, and/or a processor provided with computer readable instructions stored on a computer readable medium. The dedicated circuitry may include digital and/or analog hardware circuits, and may include integrated circuits (ICs) and/or discrete circuits. The programmable circuitry may include reconfigurable hardware circuits including memory elements such as logic AND, logic OR, logic XOR, logic NAND, logic NOR, and other logic operations, flip-flops, registers, field programmable gate arrays (FPGA), programmable logic arrays (PLA), and the like.

The computer readable medium may include any tangible device capable of storing instructions for execution by a suitable device, so that the computer readable medium having the instructions stored therein will have a product including instructions that can be executed to create means for performing the operations designated in flowcharts or block diagrams. Examples of the computer readable medium may include an electronic storage medium, a magnetic storage medium, an optical storage medium, an electromagnetic storage medium, a semiconductor storage medium, and the like. More detailed examples of the computer readable storage medium may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, etc.

Computer readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk (registered trademark), JAVA (registered trademark), C++, etc., and conventional procedural programming languages, such as the "C" programming language or similar programming languages.

Computer readable instructions may be provided to a processor of a general purpose computer, special purpose computer, or other programmable data processing apparatus, or to programmable circuitry, locally or via a local area network (LAN), wide area network (WAN) such as the Internet, etc., so that the processor of the general purpose computer, special purpose computer, or other programmable data processing apparatus, or the programmable circuitry executes the computer readable instructions to create means for performing operations specified in the flowcharts or block diagrams. Examples of the processor include a computer processor, a processing unit, a microprocessor, a digital signal processor, a controller, a microcontroller, and the like.

Figure 7:
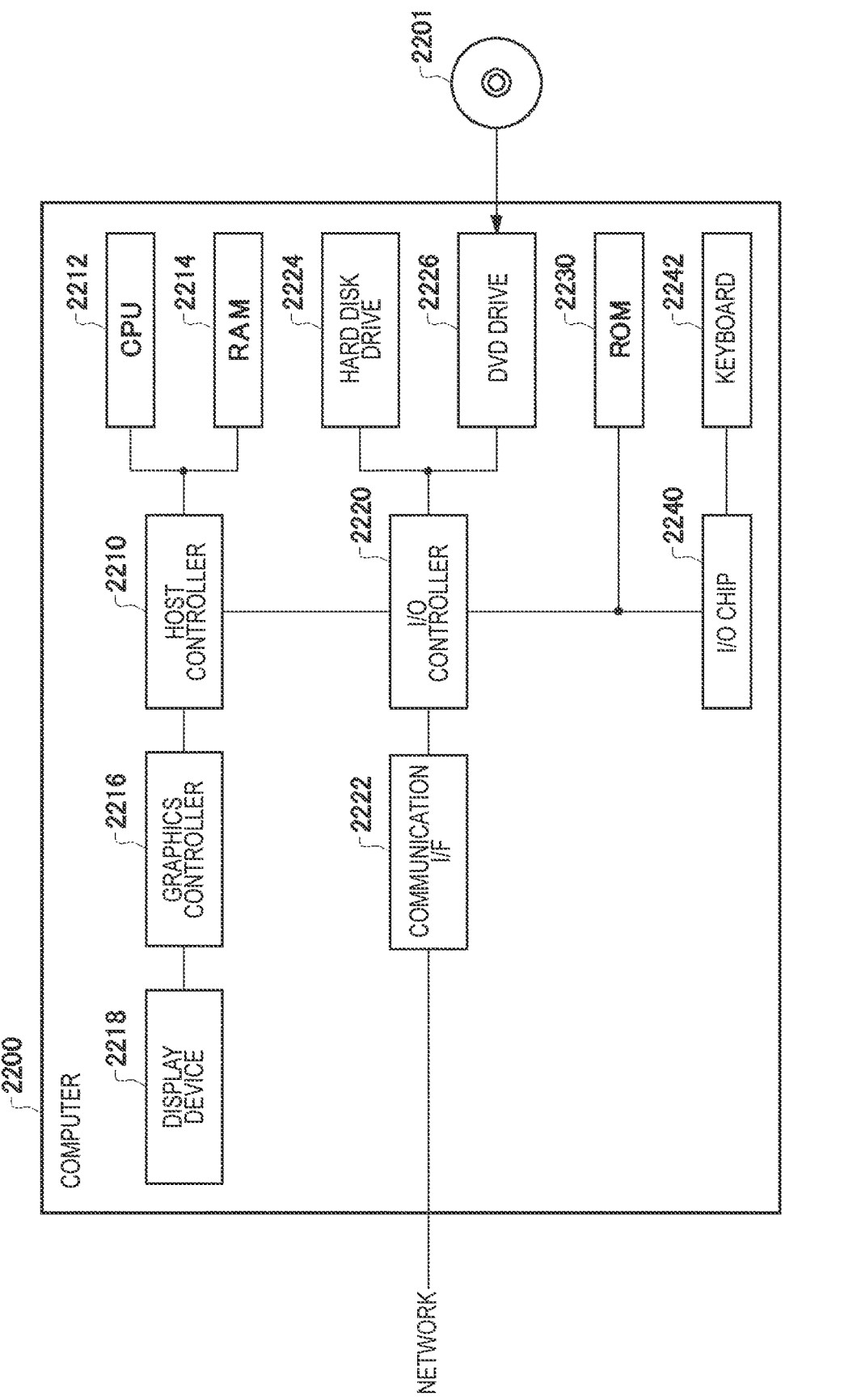
FIG. 7 shows an example of a computer 2200 in which a plurality of aspects of the present invention may be embodied in whole or in part.

FIG. 7 shows an example of a computer 2200 in which a plurality of aspects of the present invention may be embodied entirely or partially. A program installed in the computer 2200 may cause the computer 2200 to function as an operation associated with the apparatuses according to the embodiments of the present invention or as one or more sections of the apparatuses, or may cause the operation or the one or more sections to be executed, and/or may cause the computer 2200 to execute a process according to the embodiments of the present invention or a stage of the process. Such programs may be executed by a CPU 2212 to cause the computer 2200 to perform certain operations associated with some or all of the blocks in the flowcharts and block diagrams described in the present specification.

The computer 2200 according to the present embodiment includes the CPU 2212, a RAM 2214, a graphic controller 2216, and a display device 2218, which are interconnected by a host controller 2210. The computer 2200 further includes input/output units such as a communication interface 2222, a hard disk drive 2224, a DVD-ROM drive 2226, and an IC card drive, which are connected to the host controller 2210 via an input/output controller 2220. The computer also includes legacy input/output units such as a ROM 2230 and a keyboard 2242, which are connected to the input/output controller 2220 via an input/output chip 2240.

The CPU 2212 operates according to programs stored in the ROM 2230 and the RAM 2214, thereby controlling each unit. The graphic controller 2216 acquires image data generated by the CPU 2212 in a frame buffer or the like provided in the RAM 2214 or in itself, such that the image data is displayed on the display device 2218.

The communication interface 2222 communicates with other electronic devices via a network. The hard disk drive 2224 stores programs and data used by the CPU 2212 within the computer 2200. The DVD-ROM drive 2226 reads a program or data from the DVD-ROM 2201 and provides the program or data to the hard disk drive 2224 via the RAM 2214. The IC card drive reads programs and data from the IC card, and/or writes programs and data to the IC card.

The ROM 2230 stores therein boot programs and the like executed by the computer 2200 at the time of activation, and/or programs that depend on the hardware of the computer 2200. The input/output chip 2240 may also connect various input/output units to the input/output controller 2220 via a parallel port, a serial port, a keyboard port, a mouse port, or the like.

A program is provided by computer-readable media such as the DVD-ROM 2201 or the IC card. The program is read from the computer-readable media, installed into the hard disk drive 2224, RAM 2214, or ROM 2230, which are also examples of computer-readable media, and executed by the CPU 2212. Information processing written in these programs is read by the computer 2200, and provides cooperation between the programs and the various types of hardware resources described above. The apparatus or method may be configured by implementing operations or processing of information according to use of the computer 2200.

For example, in a case where communication is performed between the computer 2200 and an external device, the CPU 2212 may execute a communication program loaded in the RAM 2214 and instruct the communication interface 2222 to perform communication processing on the basis of a process described in the communication program.

Under the control of the CPU 2212, the communication interface 2222 reads transmission data stored in a transmission buffer processing area provided in a recording medium such as the RAM 2214, the hard disk drive 2224, the DVD-ROM 2201, or the IC card, transmits the read transmission data to the network, or writes reception data received from the network in a reception buffer processing area or the like provided on the recording medium.

In addition, the CPU 2212 may cause the RAM 2214 to read all or a necessary part of a file or database stored in an external recording medium such as the hard disk drive 2224, the DVD-ROM drive 2226 (DVD-ROM 2201), the IC card, or the like, and may execute various types of processing on data on the RAM 2214. Then, the CPU 2212 writes the processed data back in the external recording medium.

Various types of information such as various types of programs, data, tables, and databases may be stored in a recording medium and subjected to information processing. The CPU 2212 may execute, on the data read from the RAM 2214, various types of processing including various types of operations, information processing, conditional judgement, conditional branching, unconditional branching, information retrieval/replacement, or the like described throughout the present disclosure and specified by instruction sequences of the programs, and writes the results back to the RAM 2214. Moreover, the CPU 2212 may retrieve information in a file, a database, or the like in the recording medium. For example, when a plurality of entries, each having an attribute value of a first attribute associated with an attribute value of a second attribute, are stored in the recording medium, the CPU 2212 may retrieve, out of said plurality of entries, an entry with the attribute value of the first attribute specified that meets a condition, read the attribute value of the second attribute stored in said entry, and thereby obtain the attribute value of the second attribute associated with the first attribute meeting a predetermined condition.

The programs or software modules described above may be stored in a computer readable medium on or near the computer 2200. In addition, a recording medium such as a hard disk or a RAM provided in a server system connected to a dedicated communication network or the Internet can be used as a computer readable medium, thereby providing a program to the computer 2200 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES 1 system
2 apparatus 3 edge device
10 user terminal
11 facility
20 vendor region
21 user region
110 equipment
111 sensor
200 algorithm storage unit
201 management data storage unit
202 management unit
203 control unit
210 operation acquisition unit
211 storage unit
212 learning data acquisition unit
213 learning processing unit
214 input data acquisition unit
215 supply unit
216 output unit
217 accuracy acquisition unit
218 notification unit
2110 learning model
2111 learning data
2112 operational data
2113 expiration date data.

What is claimed is:

1. An apparatus comprising at least one processor, wherein:
the apparatus comprises a storage unit that stores at least one user account of at least one user for each of a plurality of learning algorithms, wherein the plurality of learning algorithms perform learning processing to at least one learning model, and wherein the storage unit stores the at least one user account for performing learning processing to the at least one learning model;
the at least one processor allows use of a first learning algorithm of the plurality of learning algorithms by the at least one user of the at least one user account if the at least one user has a use authorization for the first learning algorithm;
the at least one processor prevents use of a second learning algorithm of the plurality of learning algorithms by the at least one user of the at least one user account if the at least one user does not have a use authorization for the second learning algorithm; and
the at least one processor performs learning processing of the at least one learning model by the first learning algorithm by using learning data supplied from the at least one user of the at least one account having the use authorization that allows use of the first learning algorithm.

2. The apparatus according to claim 1, wherein:
the apparatus registers a new learning algorithm other than the first learning algorithm and the second learning algorithm in the storage unit; and
the storage unit stores a developer account of a developer of the new learning algorithm having a use authorization that allows use of the new learning algorithm.

3. The apparatus according to claim 2, wherein the storage unit stores an expiration date of the use authorization for at least one of the first learning algorithm or the new learning algorithm for at least one of the at least one user or the developer.

4. The apparatus according to claim 2, wherein the at least one processor causes the at least one user of the at least one user account having the use authorization that prevents use of the second learning algorithm to allow use of a use target learning algorithm among the plurality of learning algorithms for which the at least one user account has use authorization that allows use of the target learning algorithm.

5. The apparatus according to claim 2, wherein the at least one processor allows use the at least one learning model to the at least one user of the at least one user account having use authorization for the first learning algorithm used in learning processing of the at least one learning model.

6. The apparatus according to claim 2, wherein:
the storage unit stores the at least one user account having use authorization that allows use for the at least one learning model of a plurality of learning models; and
the storage unit stores the at least one user account having user authorization that prevents use for the at least one learning model of the plurality of learning models.

7. The apparatus according to claim 1, wherein the storage unit stores an expiration date of the use authorization for the first learning algorithm for the at least one user.

8. The apparatus according to claim 1, wherein the at least one processor causes the at least one user of the at least one account having the use authorization that prevents use of the second learning algorithm to allow use of a use target learning algorithm among the plurality of learning algorithms for which the at least one user account has use authorization that allows use of the target learning algorithm.

9. The apparatus according to claim 1, wherein the at least one processor allows use of the at least one learning model to the at least one user of the at least one user account having use authorization for the first learning algorithm used in learning processing of the at least one learning model.

10. The apparatus according to claim 9, wherein the at least one processor allows use of a target learning model of a plurality of learning models by the at least one user of the at least one account based on a use authorization of the at least one user for the target learning model, wherein the plurality of learning models includes the at least one learning model.

11. The apparatus according to claim 9, wherein:
the at least one processor acquires input data for the at least one learning model of a plurality of learning models that allows learning processing by the first learning algorithm from the at least one user of the at least one user account or from a sensor set by the at least one user of the at least one user account that is allowed use of the first learning algorithm;
the at least one processor supplies the acquired input data to the at least one learning model that is allowed use by the at least one user of the first learning algorithm; and
the at least one processor outputs output data output from the at least one learning model that is allowed use by the at least one user of the first learning algorithm, to which the input data has been input, to the at least one user that is allowed use of the first learning algorithm.

12. The apparatus according to claim 11, wherein the at least one processor performs the learning processing of the at least one learning model by using learning data including the input data according to an instruction from the at least one user of the at least one user account.

13. The apparatus according to claim 11, wherein:
the at least one processor acquires an accuracy of the output data output from the at least one learning model; and
the at least one processor notifies, in response to a fact that the acquired accuracy is lower than a reference value, the at least one user of the at least one account of the fact.

14. The apparatus according to claim 13, wherein
the at least one processor supplies the acquired input data to another learning model of the plurality of learning models,
the at least one processor determines an accuracy of the output data output from the another learning model, and
in response to a fact that the accuracy of the output data of the another learning model is higher than the accuracy of the output data of the at least one learning model, the at least one processor notifies the at least one user of the at least one account of the fact.

15. The apparatus according to claim 13, wherein the at least one processor performs the learning processing of the at least one learning model by using learning data including the input data according to an instruction from the at least one user of the at least one user account.

16. The apparatus according to claim 1, wherein:
the storage unit stores the at least one user account having use authorization that allows use for the at least one learning model of a plurality of learning models; and
the storage unit stores the at least one user account having use authorization that prevents use for the at least one learning model of the plurality of learning models.

17. The apparatus according to claim 16, wherein:
the at least one processor acquires input data for the at least one learning model of the plurality of learning model that allows learning processing by the first learning algorithm from the at least one user of the at least one user account or from a sensor set by the at least one user of the at least one user account that is allowed use of the first learning algorithm;
the at least one processor supplies the acquired input data to the at least one learning model that is allowed use by the at least one user of the first learning algorithm; and
the at least one processor outputs output data output from the at least one learning model that is allowed use by the at least one user of the first learning algorithm, to which the input data has been input, to the at least one user that is allowed use of the first learning algorithm.

18. The apparatus according to claim 16, wherein
the at least one processor prevents use of a target learning model of the plurality of learning models by the at least one user of the at least one account based on use authorization of the at least one user for the target learning model.

19. A method comprising:
storing at least one user account of at least one user for each of a plurality of learning algorithms, wherein the plurality of learning algorithms perform learning processing to at least one learning model, and wherein the storing stores the at least one user account for performing learning processing to the at least one learning model;
controlling use by allowing use of a first learning algorithm of the plurality of learning algorithms by the at least one user of the at least one user account if the at least one user has a use authorization for the first learning algorithm;
controlling use by preventing use of a second learning algorithm of the plurality of learning algorithms by the at least one user of the at least one user account if the at least one user does not have a use authorization for the second learning algorithm; and
processing learning by performing learning processing of the at least one learning model by the first learning algorithm by using learning data supplied from the at least one user of the at least one account having the use authorization that allows use of the first learning algorithm.

20. A non-transitory computer readable medium having recorded thereon a program that causes a computer to function as:

a storage unit configured to store at least one user account of at least one user for each of a plurality of learning algorithms, wherein the plurality of learning algorithms perform learning processing to at least one learning model, and wherein the storage unit stores the at least one user account for performing learning processing to the at least one learning model;

a use control unit configured to allow use of a first learning algorithm of the plurality of learning algorithms by the at least one user of the at least one user account if the at least one user has a use authorization for the first learning algorithm, wherein the use control unit is configured to prevent use of a second learning algorithm of the plurality of learning algorithms by the at least one user of the at least one user account if the at least one user does not have a use authorization for the second learning algorithm; and a learning processing unit configured to perform learning processing of the at least one learning model by the first learning algorithm by using learning data supplied from the at least one user of the at least one account having the use authorization that allows use of the first learning algorithm.

* * * * *